Aug. 10, 1943.   R. G. LE TOURNEAU   2,326,371
MULTIPLE CHUCK TURRET
Filed Oct. 25, 1941   2 Sheets-Sheet 2
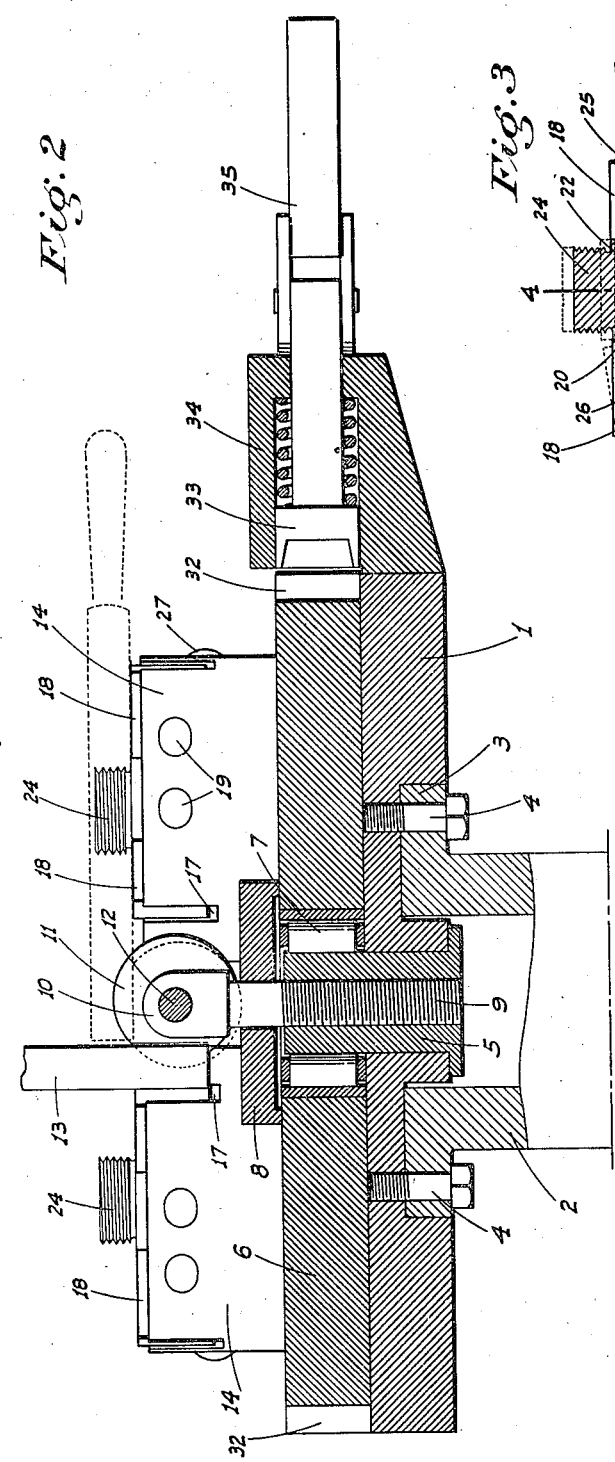
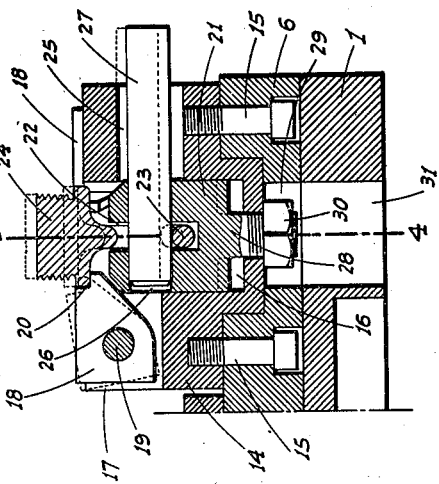
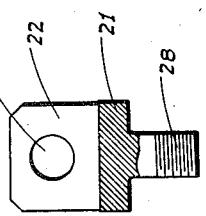
INVENTOR
R. G. LeTourneau
BY
ATTYS Patented Aug. 10, 1943

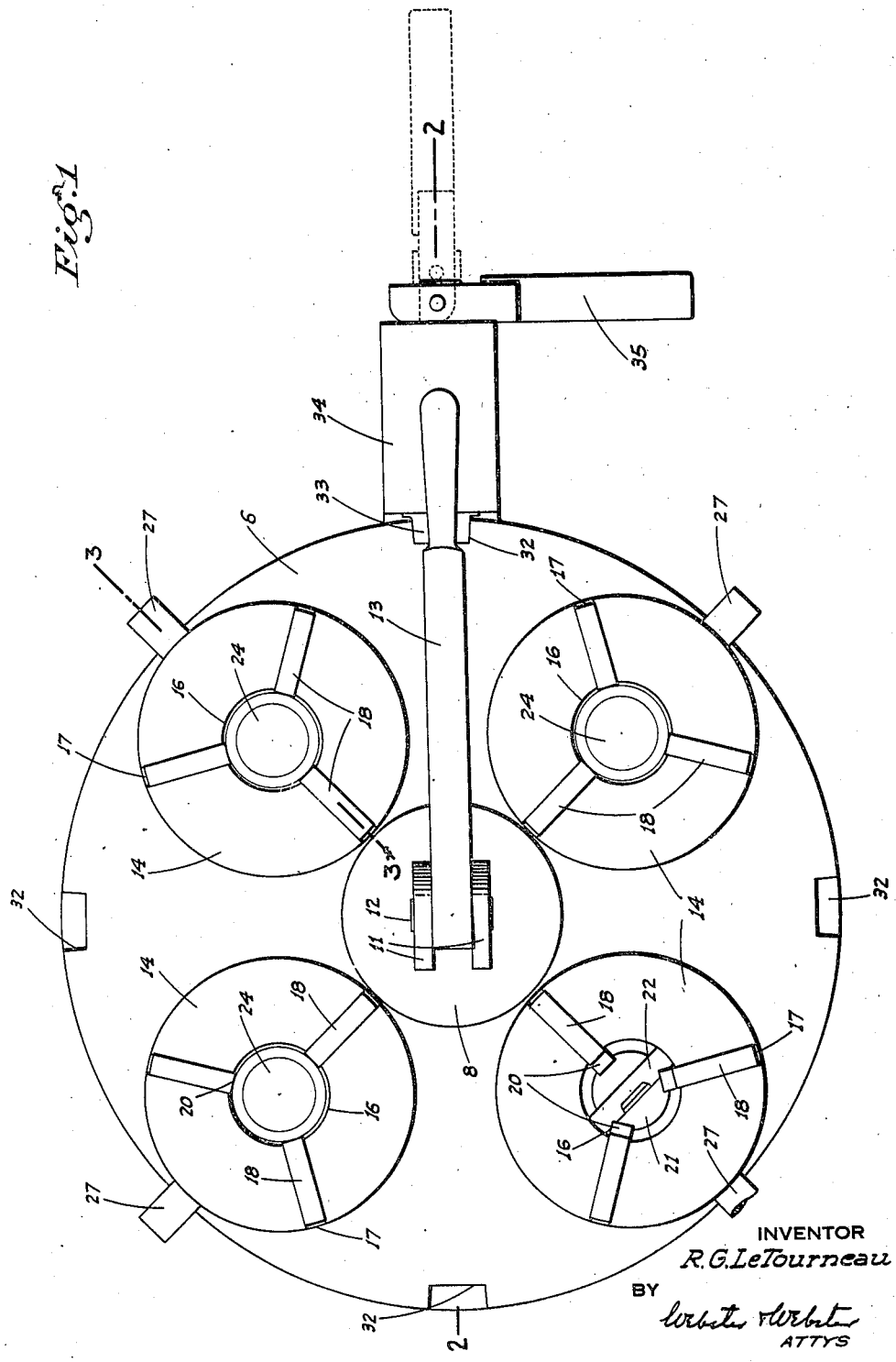

2,326,371

UNITED STATES PATENT OFFICE 2,326,371

MULTIPLE CHUCK TURRET

Robert G. Le Tourneau, Peoria, Ill., assignor to R. G. Le Tourneau, Inc., a corporation Application October 25, 1941, Serial No. 416,514

1 Claim. (Cl. 29—38)

This invention relates in general to machine lathes; and in particular the invention is directed to, and it is the principal object to provide, a unique multiple chuck turret for a machine lathe.

Another object of the invention is to provide a multiple chuck turret which includes novel means mounting the multiple chucks for ready movement one after the other to different positions for machining of the chucked work; said means including fast releasable instrumentalities normally securing the turret turning disc against rotation and axial movement relative to the turret quill plate.

A further object of the invention is to provide a work holding chuck which embodies novel jaw assembly and related mechanism; the chuck including means to retract the work axially and the jaws being arranged so that upon engagement by the work and said axial movement of the latter, the jaws automatically move radially inward to grip and center said work.

It is also an object of the invention to provide a multiple chuck turret having individual chucks as in the preceding paragraph, and which are designed particularly to engage, center and hold work having an eye on one end thereof, as for example, lifting plugs for projectiles.

A further object of the invention is to produce a simple, and inexpensive device, and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a front elevation of the multiple chuck turret.

Figure 2 is a sectional elevation of the turret on line 2—2 of Fig. 1.

Figure 3 is a cross section of one of the chucks taken on line 3—3 of Fig. 1.

Figure 4 is a sectional view of the work retainer or draw body embodied in each of the chucks, taken on line 4—4 of Fig. 3.

Referring now more particularly to the characters of reference on the drawings, the device comprises a heavy-duty back or quill plate 1 of circular configuration and having an axially projecting attachment sleeve 2 fixed thereto at the back, by means of a flanged countersunk end portion 3 retained by bolts 4; such attachment sleeve being adapted to be mounted in a suitable manner on a tailstock spindle whereby the turret may be advanced or retracted lengthwise of the lathe bed, while maintaining plate 1 non-rotatable.

A stub shaft 5 extends in fixed relation axially through the back plate 1 and projects a short distance beyond the face thereof. A circular turning disc or face plate 6 is disposed in face to face engagement with back plate 1 and is rotatably and slidably mounted on the projecting portion of stub shaft 5 by means of an anti-friction bearing 7. A friction holding disc 8 of relatively small diameter engages face plate 6 centrally, and a stem 9 extends axially through said disc and is threaded into the stub shaft; the outer end of said stem being formed as a head 10. Disc cams 11 are pivoted as at 12 on opposite sides of the head and are arranged upon rotation to wedge against holding disc 8, which in turn frictionally locks the face plate 6 against back plate 1. A handle 13 is secured in cams 11 substantially tangentially thereof and when said cams are in locking position the handle projects radially of the turret, as shown in Figs. 1 and 2.

A plurality of chucks, whose cylindrical bodies are indicated at 14, are mounted on the face plate 6 in evenly spaced relation circumferentially thereof and about the friction holding disc 8, the handle 13 being in a radial plane between certain adjacent chucks. The chuck bodies, which are of substantial thickness, are rigidly attached to the face plate by means of cap screws 15; the axis of said chucks being parallel to the axis of the face plate 6.

As each chuck is of the same construction, a description of one will suffice for the purpose of this specification.

The cylindrical chuck body 14 is formed with a central or axial socket 16 of substantial diameter and depth, which opens forwardly. A plurality of evenly spaced radial jaw-receiving slots 17 are cut in the outer face of the chuck body and extend from socket 16 to the periphery of said body. Chuck jaws 18 are disposed edgewise in said slots and are pivoted therein at 19 for swinging movement in a direction lengthwise of the chuck body.

At their radially inner and forward corners the jaws are each formed with a work engaging notch 20 disposed ahead of their pivots axially of the chuck. The edge of each notch forms a work abutment shoulder and the outer edge thereof is serrated to provide the work gripping face. The radially inner and rearward corners of the jaws are cut away or beveled to provide sufficient clearance for a draw body 21 slidably disposed in socket 16 rearwardly of said jaws.

This draw body is slotted across and to a substantial depth from its forward or outer end as at 22 for the reception of the eye 23 on the work 24 which is here shown as being the cylindrical lifting plug for a projectile. The chuck body 14 and the draw body 21 are formed with matching bores 25 and 26, respectively, through which an eye retain pin 27 projects whereby to secure the eye 23 and body 21 against separation, bore 25 being in the form of a slot extending axially of the chuck. A draw bolt 28 extends rearwardly from the draw body 21 through the chuck body into a recess 29 in the back of the face plate 6, and an adjustment nut 30 is threaded on the bolt in said recess.

Access to the nut 30 of each chuck is had through an opening 31 in the back plate 1. When the work is secured by its eye to the draw body and the nut thereafter taken up, inward motion of the draw body and work results as the work is engaged at circumferentially spaced points in jaw notches 20. Such inward motion likewise results in inward swinging movement of the jaws and until the serrated jaw portions bite into the work with a cam action securing the work in the chuck for machining, such as end cutting, threading, etc. The diameter of the work where engaged by the jaw notches is of course smaller than that of the notch circle when the jaws initially engage the work.

At circumferentially spaced points in its periphery, and corresponding to the spacing of the chucks, the face plate is notched as indicated at 32. A spring pressed dog 33, slidable in a radial housing 34 mounted on the back plate 1 and overhanging the face plate, normally engages in one of said notches 32, but is releasable by means of a cam action lever 35 connected with the outer end of dog 33.

With release of dog 33, together with friction disc 8, the face plate may be rotated relative to the back plate so that in this manner the chucks may progressively be moved from one station to another; the lathe preferably being set up to effect different but simultaneous machining operations at the different stations.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A multiple chuck turret comprising a fixed back plate, a rotatable face plate mounted in face to face engagement therewith, and a plurality of chucks mounted on the face plate in symmetrical and circumferentially spaced relation, said chucks each including a chuck jaw actuating bolt projecting parallel to the chuck axis inwardly into a recess formed in and which opens to the back of said face plate, a nut threaded on the bolt and seated in the recess, both the bolt and nut terminating short of the plane of the back surface of said face plate; the back plate normally overlying said recesses but having a tool access opening disposed to successively register with said recesses upon rotation of the face plate, and means to releasably hold the face plate against movement relative to the back plate when any such registry is obtained.

ROBERT G. LE TOURNEAU.